(12) United States Patent
Logan, III et al.

(10) Patent No.: US 6,243,857 B1
(45) Date of Patent: *Jun. 5, 2001

(54) WINDOWS-BASED FLOWCHARTING AND CODE GENERATION SYSTEM

(75) Inventors: Frank G. Logan, III, Ann Arbor, MI (US); Kenneth W. Bunch, Newport News, VA (US); Teddy Martin Davis, Norfolk, VA (US); Jeffrey M. Achesinski, Virginia Beach, VA (US)

(73) Assignee: NemaSoft, Inc., Ann Arbor, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/024,773

(22) Filed: Feb. 17, 1998

(51) Int. Cl.[7] ........................................ G06F 9/45
(52) U.S. Cl. ........................................ 717/1; 717/5
(58) Field of Search ................... 395/701, 703, 395/707; 364/191; 345/433, 333; 717/1, 5, 3, 7; 707/102; 700/86, 83; 709/100

(56) References Cited

U.S. PATENT DOCUMENTS

| | | | |
|---|---|---|---|
| 4,315,315 | * | 2/1982 | Kossiakoff ........................... 717/1 |
| 4,831,580 | * | 5/1989 | Yamada ............................. 345/433 |
| 4,852,047 | * | 7/1989 | Lavallee et al. .................... 700/86 |
| 4,956,773 | * | 9/1990 | Saito ..................................... 717/3 |
| 5,327,568 | * | 7/1994 | Maejima et al. ...................... 717/7 |
| 5,386,508 | * | 1/1995 | Itonori et al. ......................... 717/1 |
| 5,893,105 | * | 4/1999 | MacLennan ..................... 707/102 |
| 5,905,649 | * | 5/1999 | Sojoodi et al. ...................... 700/83 |
| 5,920,479 | * | 6/1999 | Sojoodi et al. ...................... 700/86 |
| 5,966,532 | * | 10/1999 | McDonald et al. .................. 717/1 |
| 6,002,395 | * | 12/1999 | Wagner et al. ................... 345/333 |
| 6,044,393 | * | 3/2000 | Donaldson et al. ............... 709/100 |

OTHER PUBLICATIONS

Microsoft, The Windows Interface Guidelines for Software Design, Microsoft Press, pp. 103–119, Mar. 1995.*

* cited by examiner

Primary Examiner—Mark R. Powell
Assistant Examiner—Hoang-Vu Anthony Nguyen-Ba
(74) Attorney, Agent, or Firm—Howard & Howard (57) ABSTRACT

A machine control system (130) includes a computer (132) that generates, edits and displays a continuous multi-block flowchart representing a program and compiles the program from the flowchart to control the operations of a machine (140). The system (130) also includes a debugger (146) for displaying the flowchart in a debugger window (170) for runtime execution control of the program.

18 Claims, 9 Drawing Sheets

WINDOWS-BASED FLOWCHARTING AND CODE GENERATION SYSTEM

TECHNICAL FIELD

The subject invention relates to a computerized machine control system which displays a flowchart of a machine control process based upon operator input and automatically generates software code from the flowchart to implement the machine control process.

BACKGROUND OF THE INVENTION

The U.S. Pat. No. 4,852,047 shows an improved machine programming and control system including the utilization of a continuous, multiple-block, flowchart or charts, all or a portion of which is displayed. Each entered flowchart is executed without conversion to other languages, such that machines are controlled in accordance with the flowcharts that are displayed. Multiple flowcharts may be entered each to separately control different machines or different parts of the same machine. The flowcharts are displayed in a multiple-block presentation and a block numbering system permits rapid on-screen generation of flowcharts, editing of the flowcharts, and debugging of the flowcharts through the utilization of an interrupt. A uniquely improved debugging system, active on an execution interrupt, permits rapid value changing for selected displayed flowchart blocks and permits a single-scan program rerun for verification. Upon run-time interruption, either the number of the flowchart block being executed at the time of interruption is automatically displayed or the block is highlighted so that a flowchart or charts may be edited and corrected on-the-fly. A new formatting system, inserts a block number format entry in the object program which is the output of the compiler, which entry is skipped by Executive program during run-time execution, but which is retrievable upon a debugging cycle.

In the U.S. Pat. No. 4,956,773, using a display terminal for conversation, a module structure diagram (schemata expressive of the connectional relations among respective program modules) is created, and a processing flow diagram (a kind of processing flowchart), an internal data definition diagram (schemata for specifying the formats etc. of arguments, common data between the modules, etc.) are created for each module, the created contents being stored in a memory. Further, the schematic information items of the module structure diagram, processing flow diagram, internal data definition diagram and interface data definition diagram are read out from the memory for each module and have stereotyped sentences and symbols added thereto, to generate the individual sentences of a source program. These sentences are edited according to the rules of a language, to complete the source program. If necessary, the various diagrams are printed out and utilized as program specifications.

The U.S. Pat. No. 5,327,568 shows an apparatus for supporting development of a graphic data driven program including a data driven mechanism enabling instructions of the data driven program to be executed whenever all input data necessary for executing the instructions is available. The apparatus includes a terminal device for inputting and displaying a graphic data driven program, an input transforming section for transforming the inputted graphic data driven program into an intermediate file by referring to an instruction information data base, a wiring table transforming section for transforming the inputted graphic data driven program into a wiring table of instructions expressed in text which is independent of a target machine by referring to the intermediate file, a compile section for transforming the wiring table into an instruction template described with a language depending on the target machine, an instruction execution section for executing the instruction template, an instruction execution displaying section for displaying results of executing the instruction template superposed on the displayed graphic data driven program, and an instruction information tracing section for comparing actual results of execution the instruction template stored in a traced information file with correct results of executing the instruction template stored in a correct data base.

SUMMARY OF THE INVENTION AND ADVANTAGES

The present invention concerns a machine programming and control system including means for editing and generating a continuous multi-block flowchart representing a program for controlling the operations of a machine, means for displaying the flowchart, continuous and contiguous portions of the flowchart containing more than one flowchart block being displayed, means for directly compiling the program from the flowchart, and means for executing the compiled program represented by the flowchart such that the machine is controlled in accordance with a displayed flowchart. A computer in the system includes the means for editing and generating connected to the machine and the display means connected to the means for editing and generating and including a screen divided into a plurality of columns and rows for displaying the flowchart with each block of a plurality of blocks being positioned at an associated intersection of one of the columns and one of the rows.

A method of machine programming and control according to the present invention includes editing and generating a continuous multi-block flowchart representing a program for controlling the operations of a machine, displaying the flowchart, continuous and contiguous portions of the flowchart containing more than one flowchart block being displayed, directly compiling the program from the flowchart, and executing the compiled program represented by the flowchart such that the machine is controlled in accordance with a displayed flowchart. The method further includes the steps of: providing the computer including the means for editing and generating a continuous multi-block flowchart representing a program for controlling the operations of the machine connected to the computer; providing the display means connected to the means for editing and generating; and displaying the screen on the display means divided into a plurality of columns and rows for displaying the flowchart with each block of a plurality of blocks being positioned at an associated intersection of one of the columns and one of the rows.

It is an object of the present invention to reduce the costs associated with machine control systems by reducing overall life cycle costs of automation equipment and by optimizing productivity.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

The FIGS. 1 through 4B correspond to like numbered drawings in the U.S. Pat. No. 4,852,047 which patent is incorporated herein by reference. Referring to the FIG. 1, a prior art machine control system generally designated by reference character 10 is shown coupled to three different robotic machines 12, 14 and 16 via buses 18, 20, and 22, respectively. The machine control system includes a CRT-type display or monitor 24 on which are presented three different flowcharts 26, 28 and 30 with each of the depicted flowcharts being a section of the larger flowchart to which is belongs. The machine control system 10 is described in more detail in the referenced patent. As will be described, the displayed flowcharts are also carried in the memory of the CPU used in the machine control system, which, in one embodiment utilizes a programmable personal computer or a like machine which has a keyboard or other entry device 32 and is provided with a debugging system 34.

Figure 1:
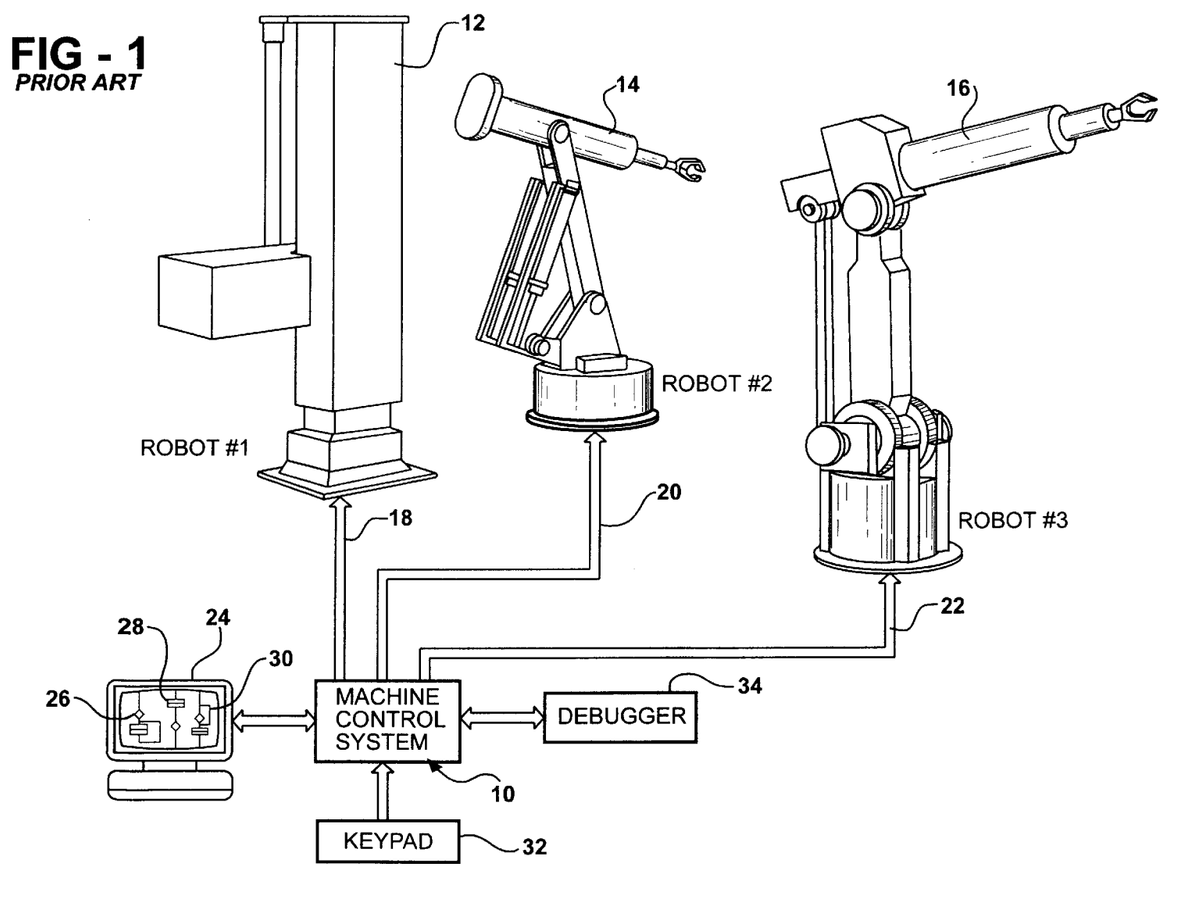
FIG. 1 is a schematic view of a prior art machine control system operating from flowcharts to control multiple machines.

It is one of the features of the subject prior art machine control system 10 that the flowcharts which are displayed on the monitor 24, are directly converted into machine language object code which results in the appropriate I/O signals being applied to the buses 18, 20 and 22 respectively to control the respective machines through direct execution of the flowchart. The flowchart is executed in the sense that its image is compiled within the machine control system and the data therefrom is loaded into an Executive program which includes a logic solver, and an I/O scanner. The output of the I/O scanner drives an I/O device or module, as will be described. The I/O module drives the respective machines or machine elements in accordance with the compiled and executed flowchart.

It is a primary feature of the prior art system 10 that the flowcharts are presented on the display in a continuous and contiguous form so that they may be readily entered into the editor portion of the CPU and also easily edited, from whence they are directly executed after they are compiled. Thus, the display of the continuous or contiguous flowcharts, or portions thereof, provides for ease of editing as well as entry, with the debugging unit 34 providing for ease of debugging an original program during a run-time execution of the program.

Again, as will be described later, in the debugging phase of the machine control system, the debugger 34, upon interrupt of the execution of the flowchart, takes control over the machine control system and displays a highlighted flowchart element on the display or monitor 24, which flowchart block is the one being executed at the time of the interrupt of the machine control. Alternatively, as will be seen, the monitor 24 may display a listing of all of the flowchart block numbers, which block numbers correspond to the blocks being executed at the time of the interrupt. From that display, one can call up through the debugger the particular flowchart block, change its value via the keypad 32, and through a single scan execute the altered program to ascertain if the machine is behaving in the manner prescribed.

Figure 2A:
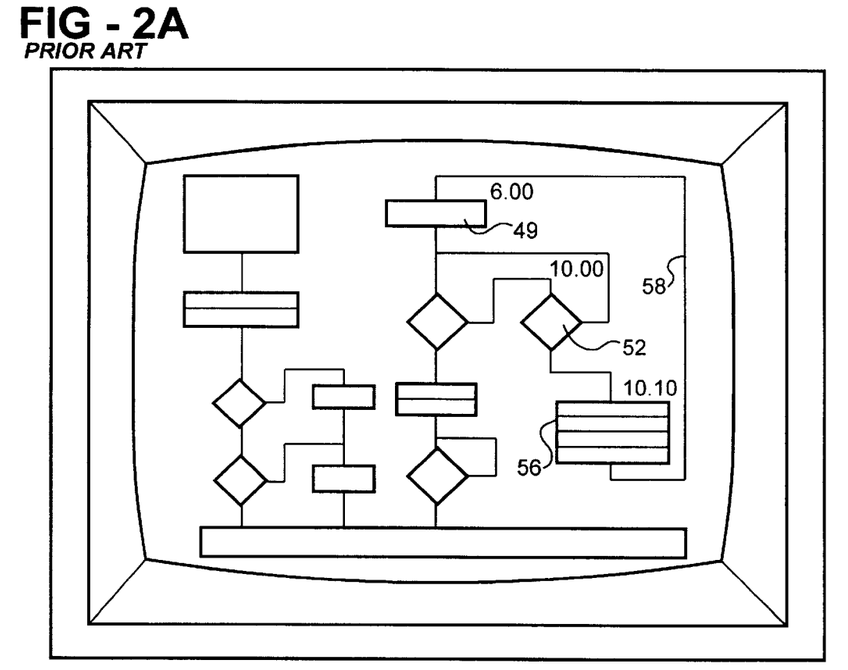
FIGS. 2A and 2B show an original flowchart and a change made after a run-time interrupt to permit on-the-fly changes and program reruns in the machine control system shown in the FIG. 1.

Referring now to FIG. 2A a typical flowchart to be executed is illustrated to include flowchart blocks 40, 42, 44, 46, 48, 49, 50, 52, 53 and 54. These flowchart blocks define a portion of a continuous flowchart, in which during an interrupt, the flowchart block 52 may be highlighted by the aforementioned debugger. It can be seen in the FIG. 2B that an additional set of flowchart blocks 56 has been added in a loop illustrated by a line 58 to correct whatever was the problem with the initial program. Thereafter, upon recompiling, the program illustrated in the FIG. 2B is executed via the system of the FIG. 1, with the simple editing having been accomplished through the addition of an additional set of blocks in the displayed flowchart.

Figure 2B:
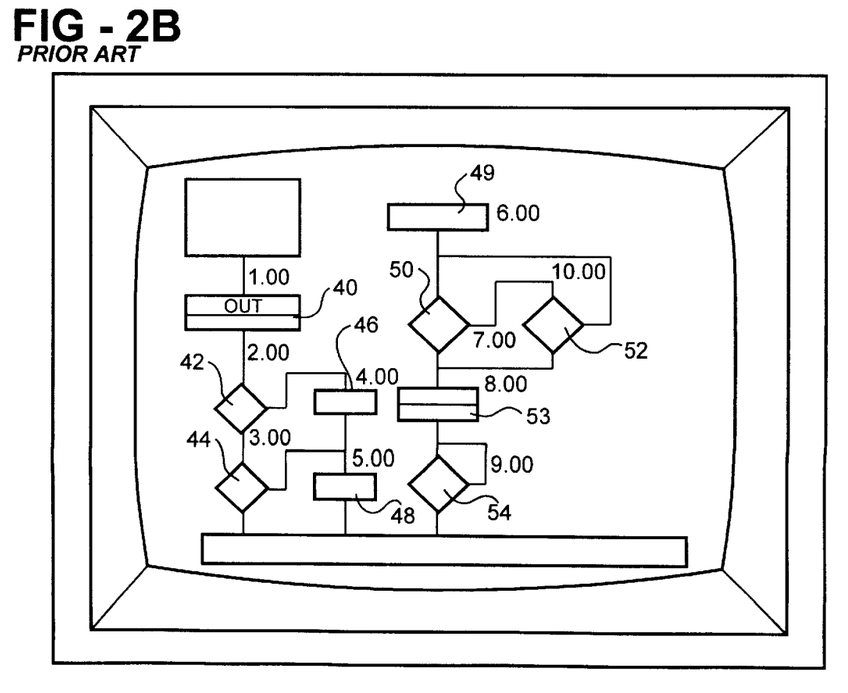

While additional flowchart blocks have been added to the initial flowchart as illustrated in the FIG. 2B, it is sometimes only necessary to change the values of preexisting flowchart blocks. In this case, the debugger does not require recompiling of the altered program but rather, in a single-scan, will execute the displayed changes in the program, assuming the blocks had merely been altered in terms of value changes.

This is an extremely advantageous way of on-the-fly editing of programmable machines in that displayed values may be changed in the debugger, and the displayed values executed without going through a complete recompile. Should more extensive change be made to the program, the debugger allows the operator to isolate and display the particular program blocks which were executing at the time of the interrupt and then re-edit the program through an editor, which will be described hereinafter. After the more complicated changes have been made by the editor, they are compiled by the compiler and loaded into the Executive program so that the machine may be properly controlled.

What will be apparent from the FIGS. 2A and 2B diagrams is that what is presented to the operator is a continuous flowchart or portion thereof, in which the flow blocks are contiguous and numbered; and in which the values are displayed immediately adjacent the flowchart blocks in the appropriate positions for the particular block. This is unlike previous systems in which if flowcharts were used, only an individual block was displayed.

Having displayed the flowchart block numbers along with the flowchart blocks, it is possible to alter the program simply and easily by editing on the screen, in which screen entries are automatically mirrored into the editor or graphic memory within the computer utilized. Thus, there is a correspondence between the displayed flowchart, the graphic memory, the editor memory and the object memory in the Executive program. This correspondence allows complete confidence that the flowchart, once edited on the screen, will be executed in precisely the manner presented by the screen.

Figure 3:
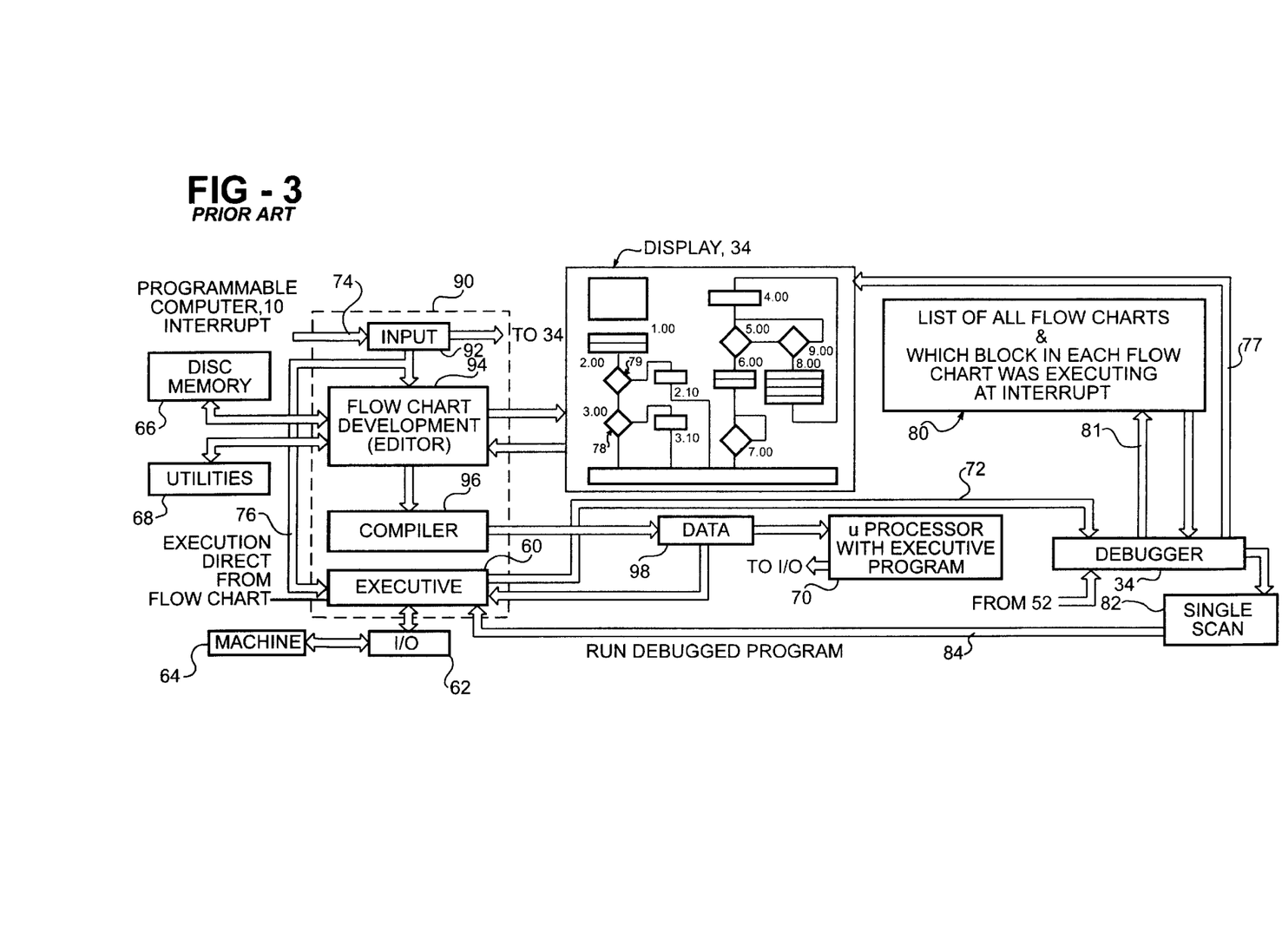
FIG. 3 is a block diagram of the machine control system shown in FIG. 1 illustrating the display of continuous flowcharts, flowchart block numbers and the debugger and interrupt system.

Referring now to the FIG. 3, the machine control system 10 is seen to include a programmable computer or CPU designated by a dotted box 90 and an input device 92, such as the aforementioned keyboard. The CPU 90 includes a flowchart development editor 94, a compiler 96 which produces object data 98 that is loaded into an executive unit 60 which includes an executive program that performs logic solving and I/O scanning functions. This unit provides signals through an I/O device 62 to a machine 64.

The flowchart development editor includes a disk memory 66, as illustrated, and a utilities package 68 which, in general, permits the development of flowchart symbology on the display 24, as illustrated to the right of the CPU 90. Note that the flowchart generating program resides in the editor. It will be appreciated that blocks and the flowcharts are numbered by numbers such as 1.00; 2.00; . . . 8.00. These block numbers identify the blocks, with the lines describing the particular order in which they are desired to be run.

As also illustrated, the object data which is represented by the block 98 may be coupled to a microprocessor 70 programmed with the aforementioned Executive program. The microprocessor 70, with its Executive program takes the place of the unit 60 and may be utilized exteriorly of the CPU to run various machines. In other words, the unit 60 of the CPU may be replaced with a preprogrammed microprocessor which, in essence, performs the same function.

It will noted that the debugger 34, is supplied with data on a bus 72 from the unit 60, in which when an interrupt 74 is inputted via the keypad 92, the unit 60 is inhibited while, at the same time, providing data to the debugger 34 to indicate which block or blocks are being executed at the time of interrupt. Inhibit signals come from the keyboard 92 over a bus 76 as illustrated.

The Debugger 34, in one embodiment, drives the display 24 via a bus 77 to highlight the particular block which was executing at the time of interrupt, this highlighting being shown by a block 78. Also, the debugger 34 may highlight in a different fashion, the flowchart execution path to that block as illustrated at 79.

In an alternative embodiment, upon inhibiting of the Executive program, a list of flowcharts plus the block number in each flowchart which was executing at the interrupt is displayed on the display 24. Here this display is illustrated by a reference character 80 which is driven via data transmitted over a bus 81.

The debugger functions in the following ways. It will be appreciated that the debugging system for the prior systems merely permitted reading of inputs, reading and changing the states of outputs, reading and changing the states of initial flags, reading and changing the values of times, counters, and registers, performing a single-scan execution or resuming or ending execution. The present debugging system performs all of the above with the added feature of display so as to alert the user quickly and to provide accurate change identification. Additionally, the subject debugger program, in one embodiment, highlights changes and flowchart paths to aid debugging. Moreover, the subject system permits full flowchart editing capabilities such as deleting blocks, moving blocks, changing flow paths or routes, and adding blocks. Thus the editor, compiler, and debugger function are combined into one program for exceptional flexibility with all relevant data displayed. Once the particular flowchart blocks have been altered to the satisfaction of the programmer, the debugger upon command can initiate a single scan, here illustrated at 82, of the newly debugged program via the keypad 92 so that it may be executed by the unit 60 via the I/O device 62, such that machine operation can be verified. The single-scan data is inputted to the unit 60 over a bus 84 as illustrated.

What will be appreciated is that the subject system permits the display of continuous flowchart blocks to aid in the flowchart development, as well as the debugging process. The block numbers are displayed for purpose of enabling the programmer to get back into the flowchart at the required spot and highlights are utilized to indicate, during an interrupt cycle, which blocks in the program were executing at the time of the interrupt.

Thus, it may be more appropriate rather than highlighting blocks on a screen since so many flowcharts are involved, to provide the listing as illustrated by the display 80, so that should the machine be carrying a large number of flowcharts, only the flowcharts that are necessary to be edited will be called up to the display.

Figure 4A:
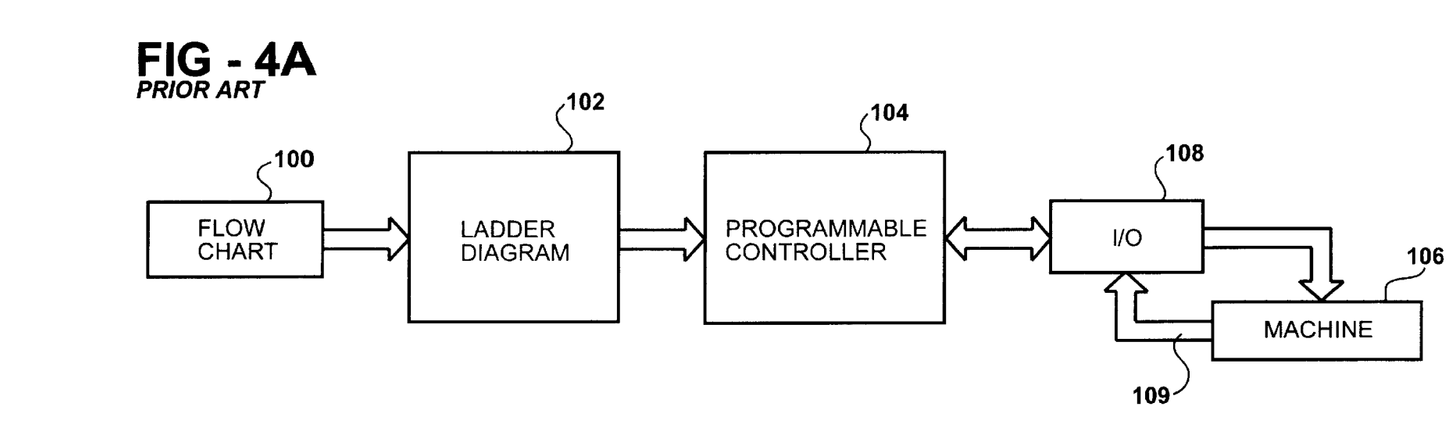
FIG. 4A is a block diagram of another prior art programmable controller system.
Figure 4B:
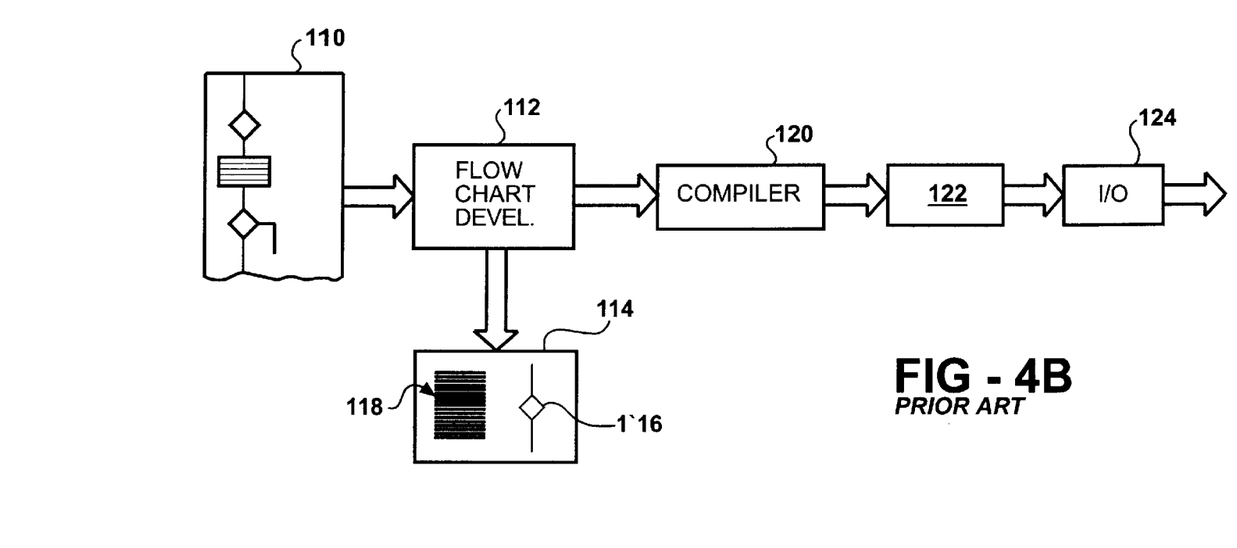
FIG. 4B is a block diagram of a prior art flowchart driven machine control involving a single flowchart block display.

To recapitulate with respect to the prior art and referring now to FIG. 4A it will be appreciated that in the prior art a manually-derived flowchart 100 was converted to a ladder diagram 102 which was then programmed into a programmable controller 104 in ladder language, which programmable controller controlled a machine 106 via an I/O device 108 that produced the requisite signals for machine control. As illustrated, a closed loop 109 from the machine provided the programmable controller with inputs derived from the machine so that the programmable controller could operate in a closed loop manner. The closed loop machines with their programmable controllers are extremely complex, as described before, and perhaps unnecessarily so in view of the subject flowchart programming and control system.

The subject system shown in the U.S. Pat. No. 4,852,047 has increased flexibility and ease of usage, as compared to the earlier system illustrated in the FIG. 4B, in which a hand-drawn flowchart 110 was, upon prompts, entered in to a flowchart development system 112 with the aid of a single-block display 114, that involved a block 116 and a menu beside it here illustrated by reference character 118. The flowchart developer, as described above, drove a compiler 120 which, in turn, drove an executive unit 122 which outputted its logic solver, and I/O scanner through an I/O device 124 to a machine (not shown).

Figure 5:
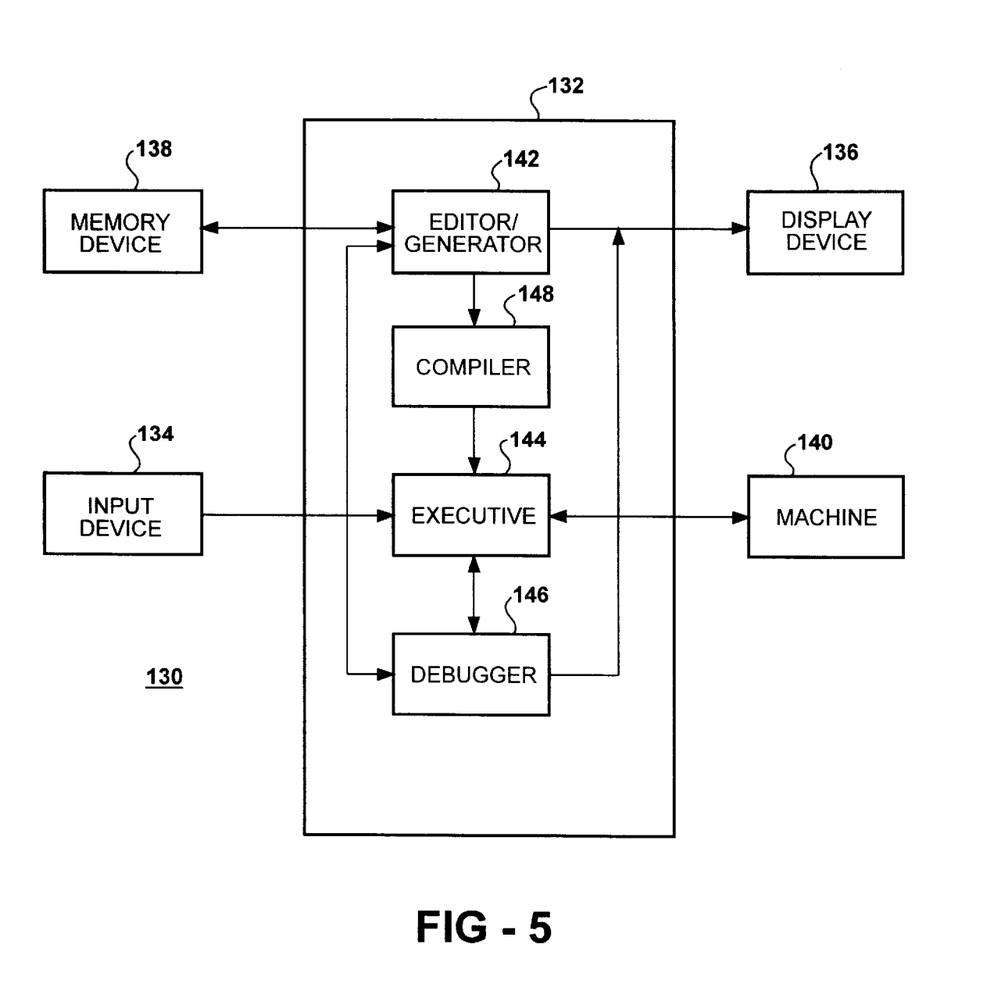
FIG. 5 is a block diagram of a machine control system in accordance with the present invention.

There is shown in the FIG. 5 a block schematic diagram of a machine control system 130 according to the present invention. The system 130 includes a computer or CPU 132 having an input connected to an output of an input device 134 such as keypad, or a mouse, or a touch screen. The computer 132 also has an output connected to an input of a display device 136, such as a monitor, and a first input/output connected to an input/output of a memory device 138, such as a hard drive. The system 130 has a second input/output connected to an input/output of a machine 140 to be controlled. In general, the system 130 operates in a manner similar to the system 10 shown in the FIG. 1 to generate, edit and display a continuous multi-block flowchart representing a program for controlling the operations of the machine 140, with continuous and contiguous portions of the flowchart containing more than one flowchart block being displayed by the display device 136. The system 140 also compiles the machine control program from the flowchart and executes the compiled program represented by the flowchart such that the machine is controlled in accordance with a displayed flowchart, whereby generation and editing of the flowchart is facilitated by the display of multiple, continuous and contiguous flowchart blocks.

The computer 132 includes an editor and generator 142, an executive 144 and a debugger 146 each having an input connected to the output of the input device 134. The editor and generator 142 and the debugger 146 each have an output connected to the input of the display device 136. The executive 144 has an input/output connected to the input/output of the machine 140. The editor and generator 142 has another output connected to an input of a compiler 148 having an output connected to another input of the executive 144. The executive 144 has an output connected to another input of the debugger 146.

The means of the system 130 shown in the FIG. 5 correspond generally to the means of the prior art system 10 shown in the FIG. 3 as follows: the programmable computers 132 and 90; the input devices 134 and 92; the display devices 136 and 24; the memory devices 138 and 66; the flowchart development editor and generators 142 and 94; the executive units 144 and 60; the debuggers 146 and 34; and the compilers 148 and 96.

The system 130 is especially useful in simplifying the shift from programmable logic controllers to off-the-shelf personal computers for manufacturing operations. The system 130 can be run utilizing a Windows based operating system, such as Windows 95 or Windows NT available from Microsoft Corporation, in the computer 132. Thus, there is provided a drag-and-drop flowchart development editor which substantially reduces development time by utilizing libraries of reuseable code. In addition, the present invention is compatible with a Hyperkernel™ real-time subsystem that provides high speed deterministic performance to the Windows NT operating system, a FloPro™ control logic engine for increasing machine performance and a Hypershare™ software permitting sharing a real-time database with any Windows NT application or network. These software programs are available from Imagination Systems, Inc. of Virginia Beach, Va.

Figure 6A:
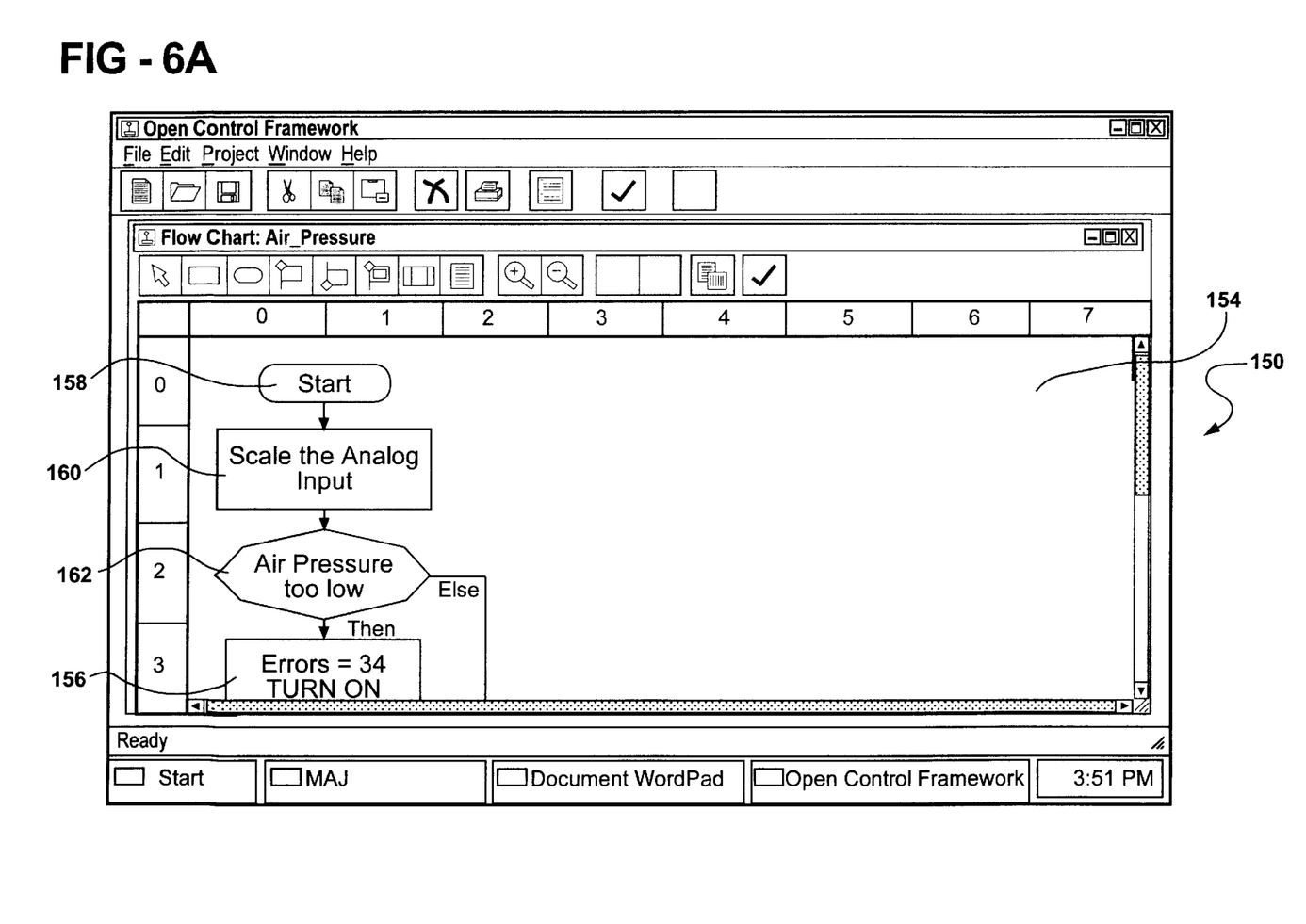
FIGS. 6A and 6B show a flowchart generated and displayed by the machine control system shown in the FIG. 5.
Figure 6B:
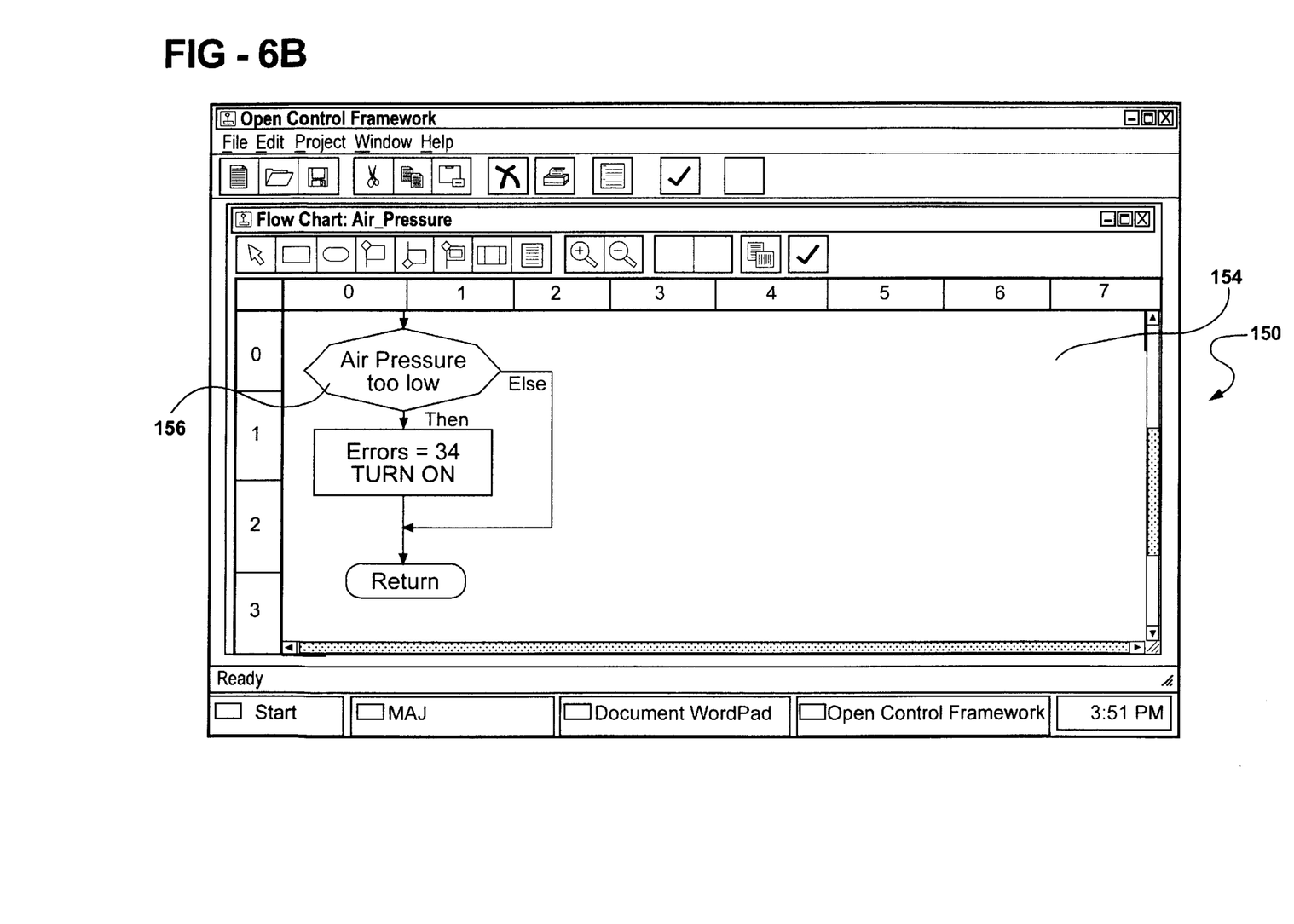

There is shown in the FIGS. 6A and 6B a flowchart generated and displayed by the machine control system 130. The editor and generator 142 generates signals to the display device 136 causing the flowchart to be displayed in a window of a screen presented by the display device. The flowchart can be scrolled to view an upper portion shown in a first screen 150 and a lower portion shown in a second screen 152. The window is divided into a first plurality of columns 154 and a second plurality of rows 156. The width of each column and the height of each row is automatically determined in accordance with the size and spacing of the various blocks forming the flowchart.

The system 130 includes several features which reduce the time required to create a flowchart or make changes to an existing flowchart. For example, the computer 132 automatically generates high level source code directly from the flowchart being created on the display device 136. When the flowchart is edited, the computer 132 automatically redraws the interconnecting lines to associated blocks. The flowchart can be increased or decreased in size, within predetermined limits, in response to operator input through the input device 134. A rule base is stored in the memory device 138 and is used by the computer 132 to discourage unstructured programs. The debugger 146 can drive the display device 136 to highlight one or more selected blocks. The flowchart blocks can be generated in a first color, e.g. a blue block 158, a block selected to be modified or replaced can be generated in a second color, e.g. a green block 160, and all blocks dependent from the selected block can be generated in a third color, e.g. a yellow block 162.

Figure 7:
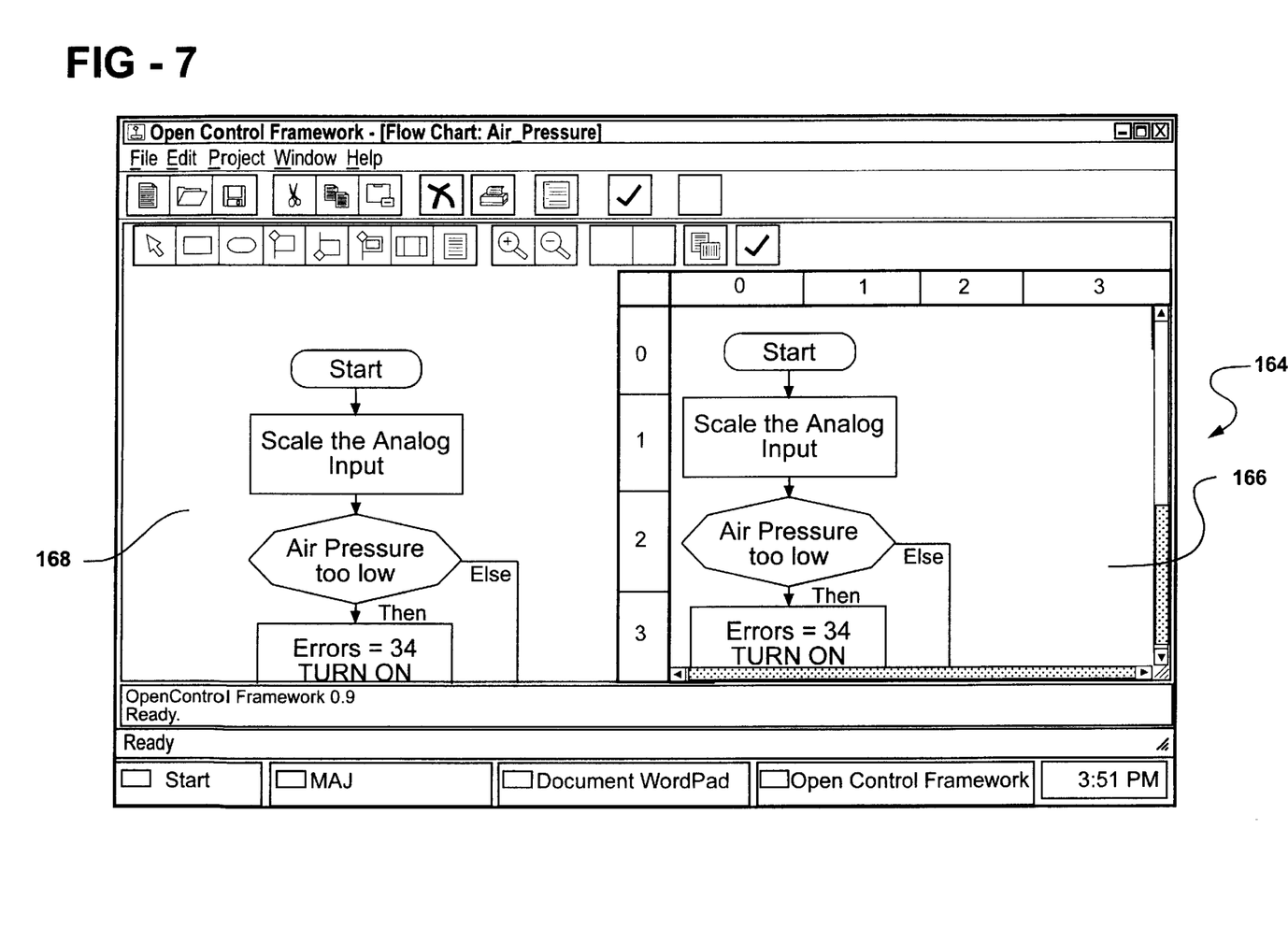
FIG. 7 shows a split screen flowchart generated and displayed by the machine control system shown in the FIG. 5.

The computer 132 also can generate a split screen which can display the generated code beside the flowchart or an enlarged section of the flowchart beside the normal size flowchart. There is shown in the FIG. 7 a split screen 164 having a right portion 166 displaying the upper portion of the flowchart shown in the FIG. 6A. A left portion 168 of the screen 164 can display the flowchart or generated code or any other desired information.

Figure 8:
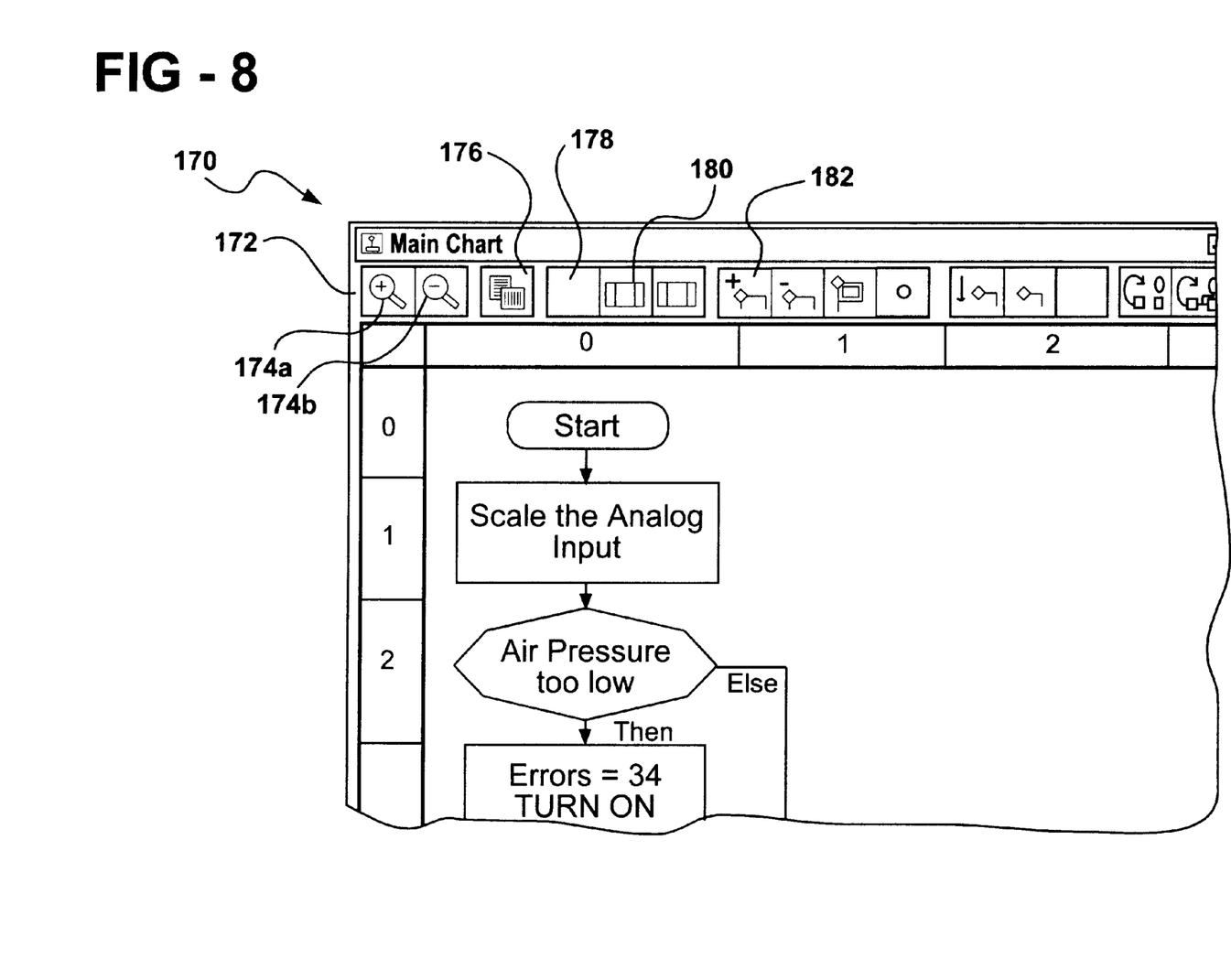
FIG. 8 shows a debugging window generated and displayed by the machine control system shown in the FIG. 5.

There is shown in the FIG. 8 a debugging window 170 generated and displayed by the system 130 by double clicking on a flowchart entry in a flowcharts page (not shown). For each flowchart selected, a separate window is opened in which the chart is displayed as shown in the FIG. 8. The window 170 includes a tool bar 172 providing access to viewing and debugging operations. The debugger window 170 displays the chart in the same format as is used by the editor and is shown in the FIGS. 6A, 6B and 7. As in the editor, tool bar options are provided for zooming in and out, displaying alternate block labels, and disabling the debugging option. The remaining options are specific to the debugger and provide runtime execution control, such as setting breakpoints and single-stepping through a chart.

While the system runs (not stopped at a breakpoint), the currently active block appears in a contrasting color such as light green. The active block is the block currently being executed in a given flowchart. This active block is changing much faster than can appear in the debugger window 170 since the actual display updates at two hundred fifty millisecond intervals and represents a snapshot of the current chart status.

Buttons, located in the tool bar 172 extending across the top of the window 170, activate tools to control program flow. The function of the button appears when the cursor arrow is passed over the button. For example, the flowchart can be viewed at several magnification levels using a Zoom In button 174a and a Zoom Out button 174b on the tool bar 172. These options determine how large or small the flowchart appears in the debugger window 170. When a flowchart is first opened, the chart appears at the maximum magnification level.

By default, the debugger displays the caption defined for each flow chart block as the block's label text in the chart. You can toggle between the default label format and an alternate format using a Toggle or Select Labels tool bar button 176. The alternate format shows the actual commands and conditions contained in the block.

By default, the debugger comes up enabled. The debugger can be disabled through the toggling of the tool bar button. This option can be used to speed up performance once the application is stable.

To select the active block, click on a Select Active Block tool bar button 178. This button selects the currently active block, as determined from its last snapshot of the chart status, and the window automatically scrolls (if necessary) to display the current block. If the active block is in a subchart, the debugger loads the subchart into the same window (to bring the block into view). When the selected block is a subchart, an Open Subchart tool bar button 180 can be used to load the associated subchart into the current debugger window 170. Once the debugger loads a subchart, a Close Subchart tool bar button can be used to close the subchart and redisplay the calling flowchart.

When a block has been selected, a breakpoint can be set at that block with an Insert/Remove Breakpoint tool bar button 182. This button toggles the breakpoint state at the currently selected block. It inserts a breakpoint, when no breakpoint exists, and removes an existing breakpoint. A color of a block that contains a breakpoint appears in red.

Current flowchart execution stops when program flow reaches the block with the breakpoint, during the normal execution cycle. Program flow stops before the chart executes the block with the breakpoint. When program flow reaches a breakpoint, the current block color changes to yellow and a small red diamond appears to the left of the block. The diamond indicates that the block contains a breakpoint. By default, the runtime system continues to execute the device input/output scan when a chart stops at a breakpoint. This feature can be disabled by toggling a Scan I/O During Single Step Mode tool bar button off. Typically, this option should remain enabled to prevent device timeouts from occurring while single-stepping through a chart. Also by default, only the chart containing the breakpoint stops—all other charts continue to run normally. This feature can be disabled by toggling a Run Charts During Single Step Mode tool bar button off. The Run Charts During Single Step Mode should typically remain enabled when working with real devices to prevent unwanted and possible dangerous side effects when all charts suddenly stop. Use caution when disabling this feature.

All breakpoints in the currently displayed chart can be removed using a Remove All Breakpoints tool bar button. When this option is selected, all breakpoints (for the current chart only) are removed. This option does not affect breakpoints in other charts. This button is enabled when there is at least one breakpoint set in the current chart. Also, all breakpoints in all chart threads can be removed using a Remove All Breakpoints In All Threads tool bar button. When selected, this option removes all breakpoints, even those set in charts that do not currently appear in the debugger. This button is enabled when a breakpoint is set in any chart.

To display a list of breakpoints currently set in all charts, a View Breakpoint List button is used. A window appears with a list of breakpoints set in all chart threads. The list includes an entry for each currently set breakpoint. Each entry includes the main chart thread name, the subchart name (if applicable), and the horizontal and vertical grid position of the block. A Go tool bar button restarts execution of the current chart after it has stopped at a breakpoint. Once restarted, execution continues normally (until program flow reaches another breakpoint). The Go button is only enabled when program flow reaches a breakpoint in the current chart. When a chart stops at a breakpoint, a Single Step tool bar button can be used to execute a single block and then stop. The color of the block that is about to be executed changes to yellow. When single-stepping through a chart, any subcharts that are stepped into or out of open or close automatically in the same window in order to display the active block. When a chart stops at a breakpoint, a Run To Cursor tool bar button can be used to restart execution and have the chart run until it reaches the selected block. This feature can be used to step over subchart calls by running to the block immediately following the subchart block.

When a chart reaches a breakpoint and execution stops, the runtime system continues to execute the device input/output scan. This feature can be disabled by toggling a Scan I/O During Single Step Mode tool bar button off. When using real inputs and outputs, this option should typically remain enabled to prevent device timeouts from occurring while single-stepping through a chart. By default, when execution of a chart stops at a breakpoint, only the chart containing the breakpoint stops—all other charts continue to run normally. This feature can be disabled by toggling a Run Charts During Single Step Mode tool bar button off. The Run Charts During Single Step Mode should typically remain enabled when working with real devices to prevent unwanted and possible dangerous side effects when all charts suddenly stop. Caution should be used when disabling this feature.

In summary, the machine programming and control system 130 according to the present invention includes the means for editing and generating 142 a continuous multi-block flowchart representing a program for controlling the operations of a machine 140, the means 136 for displaying the flowchart, continuous and contiguous portions of the flowchart containing more than one flowchart block being displayed, the means for directly compiling 148 the program from the flowchart, and the means for executing 144 the compiled program represented by the flowchart such that the machine is controlled in accordance with a displayed flowchart. The computer 132 in the system 130 includes the means for editing and generating 142 connected to the machine 140 and the display means 136 connected to the means for editing and generating 142 and including the screen 150, 152 divided into a plurality of columns 154 and rows 156 for displaying the flowchart with each block of a plurality of blocks 158, 160, 162 being positioned at an associated intersection of one of the columns and one of the rows.

The method of machine programming and control according to the present invention includes editing and generating a continuous multi-block flowchart representing a program for controlling the operations of a machine, displaying the flowchart, continuous and contiguous portions of the flowchart containing more than one flowchart block being displayed, directly compiling the program from the flowchart, and executing the compiled program represented by the flowchart such that the machine is controlled in accordance with a displayed flowchart. The method further includes the steps of: a. providing the computer 132 including the means for editing and generating 142 a continuous multi-block flowchart representing a program for controlling the operations of the machine 140 connected to the computer; b. providing the display means 136 connected to the means for editing and generating 142; and c. displaying the screen 150, 152 on the display means 136 divided into a plurality of columns 154 and rows 156 for displaying the flowchart with each block of a plurality of blocks 158, 160, 162 being positioned at an associated intersection of one of the columns and one of the rows.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A machine programming and control system (130) including means for editing and generating (142) a continuous multi-block flowchart representing a program for controlling the operations of a machine (140), means (136) for displaying the flowchart, continuous and contiguous portions of the flowchart containing more than one flowchart block being displayed, means for directly compiling (148) the program from the flowchart, and means for executing (144) the compiled program represented by the flowchart such that the machine is controlled in accordance with a displayed flowchart, comprising:

a computer (132) for editing, debugging, and generating (142) a continuous multi-block flowchart representing a program and for controlling the operations of a machine (140) connected to said computer in accordance with said flowchart; and a display (136) connected to said computer for editing and generating (142) and including a screen (150,152) divided into a plurality of columns (154) each having a width and a plurality of rows (156) each having a height, the display (136) for displaying the flowchart with a plurality of blocks (158,160,162), each of said plurality of blocks (158,160,162) being disposed within a cell defined by said columns (154) and rows (156);

said computer automatically displaying a first of said blocks in a first color and to display all remaining ones of said blocks in a second color.

2. The system (130) according to claim 1 wherein said computer (132) automatically generates high level source code for the program from the flowchart.

3. The system (130) according to claim 1 wherein said computer (132) automatically draws a connecting line between two associated ones of said blocks (158, 160, 162) after editing.

4. The system (130) according to claim 1 wherein said computer (132) causes said display (136) to display a split screen (164) having two portions (166,168) and selectively displaying blocks (158, 160, 162) in at least one of said portions.

5. The system (130) according to claim 4, wherein said computer (132) includes means for selectively displaying a second set of blocks (158,160,162) in an other of said portions.

6. The system (130) according to claim 4, wherein said computer (132) includes means for selectively displaying a list of source code associated with said first of said blocks (158,160,162) in an other of said portions.

7. The system (130) according to claim 4, wherein said computer (132) includes means for selectively displaying one of a second set of blocks (158,160,162) and a list of source code associated with said first of said blocks (158, 160,162) in an other of said portions.

8. The system (130) according to claim 1 wherein said computer (132) causes said display means (136) to form a debugging window (170) for displaying said blocks (158, 160, 162) and having a tool bar (172) for controlling program flow.

9. The system (130) according to claim 8 wherein said tool bar (172) includes a Toggle Labels button (176) and said computer (132) responds to actuation of said button for switching between default labels and alternate labels displayed for said blocks (158, 160, 162).

10. The system (130) according to claim 8 wherein said tool bar (172) includes a Select Active Block button (178) and said computer (132) responds to actuation of said button for displaying a currently active one of said blocks (158, 160, 162).

11. The system (130) according to claim 8 wherein said tool bar (172) includes an Insert/Remove breakpoint button (182) and said computer (132) responds to actuation of said button for displaying a currently active one of said blocks (158, 160, 162) in a predetermined color and stopping execution of the program before executing said currently active block.

12. The system (130) according to claim 11 wherein when the program reaches one of said blocks (158, 160, 162) having a breakpoint, said computer (132) responds by changing said predetermined color to another predetermined color.

13. The system (130) according to claim 1, wherein said computer (132) includes means for adding a break point associated with a flowchart block (158,160,162) and wherein the computer being adapted to stop at said break point during said debugging mode.

14. The system (130) according to claim 1, wherein a width of each column (154) and a height of each row (156) is determined in accordance with a size and spacing of said blocks (158,160,162).

15. A machine programming and control system (130) including means for editing and generating (142) a continuous multi-block flowchart representing a program for controlling the operations of a machine (140), means (136) for displaying the flowchart, continuous and contiguous portions of the flowchart containing more than one flowchart block being displayed, means for directly compiling (148) the program from the flowchart, and means for executing (144) the compiled program represented by the flowchart such that the machine is controlled in accordance with a displayed flowchart, comprising:

a computer (132) for editing and generating (142) a continuous multi-block flowchart representing a program and for controlling the operations of a machine (140) connected to said computer in accordance with said flowchart, and a display (136) connected to said computer for editing and generating (142) and including a screen (150,152) divided into a plurality of columns (154) each having a width and a plurality of rows (156) each having a height, the display (136) for displaying the flowchart with a plurality of blocks (158,160,162), each of said plurality of blocks (158,160,162) being disposed within a cell defined by said columns (154) and rows (156);

said computer automatically displaying a first of said blocks in a first color and wherein said computer (132) causes said display (136) to display all of said blocks (158, 160, 162) dependent from said first of said blocks with a second color, and to display all remaining ones of said blocks in a third color.

16. The system (130) according to claim 15, wherein a width of each column (154) and a height of each row (156) is determined in accordance with a size and spacing of said blocks (158,160,162).

17. A method of machine programming and control including editing and generating a continuous multi-block flowchart representing a program for controlling operations of a machine, displaying the flowchart, continuous and contiguous portions of the flowchart containing more than one flowchart block being displayed, directly compiling the program from the flowchart, and executing the compiled program represented by the flowchart such that the machine is controlled in accordance with a displayed flowchart, the method comprising the steps of:

editing and generating (142) the continuous multi-block flow chart representing a program for controlling the operations of a machine (140) connected to the computer;

operating the machine in accordance with the flowchart;

displaying a plurality of blocks (158,160,162) on a screen (150,152) divided into a plurality of columns (154) and rows (156), the plurality of blocks (158,160,162) comprising the flowchart, each of said plurality of blocks (158,160,162) being disposed within a cell defined by said columns (154) and rows (156);

automatically displaying a first of said blocks in a first color, all of said blocks (158, 160, 162) dependent from said first of said blocks in a second color, and all remaining blocks in a third color.

18. The method according to claim 17, wherein a width of each column (154) and a height of each row (156) is determined in accordance with a size and spacing of said blocks (158,160,162).

* * * * *